United States Patent
Bone

(10) Patent No.: US 9,244,252 B1
(45) Date of Patent: Jan. 26, 2016

(54) OPTICAL LENS SYSTEM

(71) Applicant: GENIUS ELECTRONIC OPTICAL CO., LTD., Taichung (TW)

(72) Inventor: Matthew Bone, Fremont, CA (US)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 0 days.

(21) Appl. No.: 14/448,633

(22) Filed: Jul. 31, 2014

(51) Int. Cl.
*G02B 9/04* (2006.01)
*G02B 9/00* (2006.01)
*G02B 13/00* (2006.01)
*G02B 7/02* (2006.01)
*G02B 1/02* (2006.01)

(52) U.S. Cl.
CPC .............. *G02B 13/0015* (2013.01); *G02B 1/02* (2013.01); *G02B 7/021* (2013.01)

(58) Field of Classification Search
CPC ........... G02B 9/04; G02B 9/06; G02B 13/003
USPC .......................................... 359/717, 793, 796
See application file for complete search history.

(56) References Cited

U.S. PATENT DOCUMENTS

2006/0215269 A1*  9/2006  Abe ..................... G02B 3/0012
                                                                   359/619

FOREIGN PATENT DOCUMENTS

| TW | 200622343 A | 7/2006 |
| TW | 200739130 A | 10/2007 |
| TW | 201118448 A | 6/2011 |
| TW | 201316071 A | 4/2013 |

OTHER PUBLICATIONS

First Office Action for Taiwanese Patent Application No. 103137644, dated Jun. 22, 2015, 7 pages (no English Translation).

* cited by examiner

*Primary Examiner* — William Choi
(74) *Attorney, Agent, or Firm* — Kilpatrick Townsend and Stockton LLP

(57) ABSTRACT

An optical lens assembly includes a first lens element having a planar object-side surface and a first fitting structure disposed on a peripheral portion of an image-side surface. A second lens element has a second fitting structure disposed on a peripheral portion of an object-side surface. The first and second lens elements are engaged with each other using the first and second fitting structures. The first lens element is made of a sapphire glass or other material having a refractive index greater than 1.6.

19 Claims, 6 Drawing Sheets

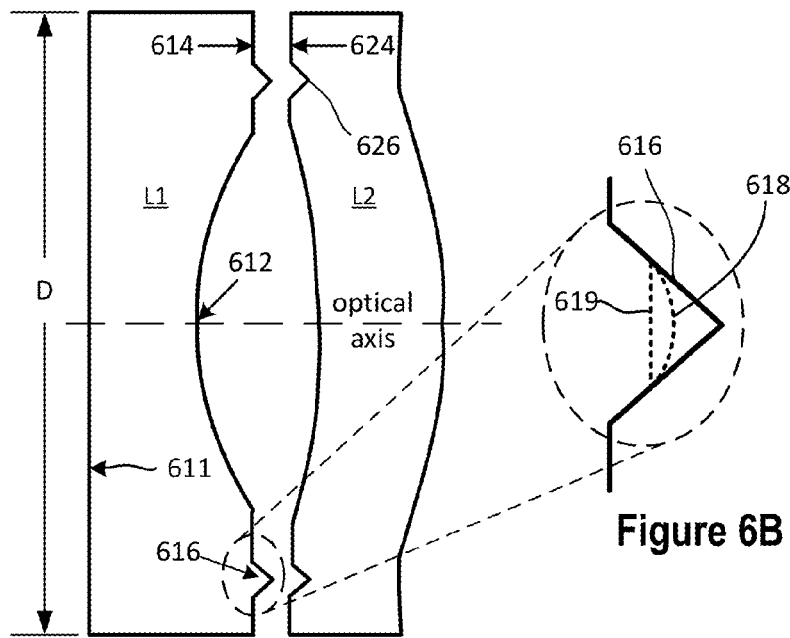
Figure 6A
Figure 6B
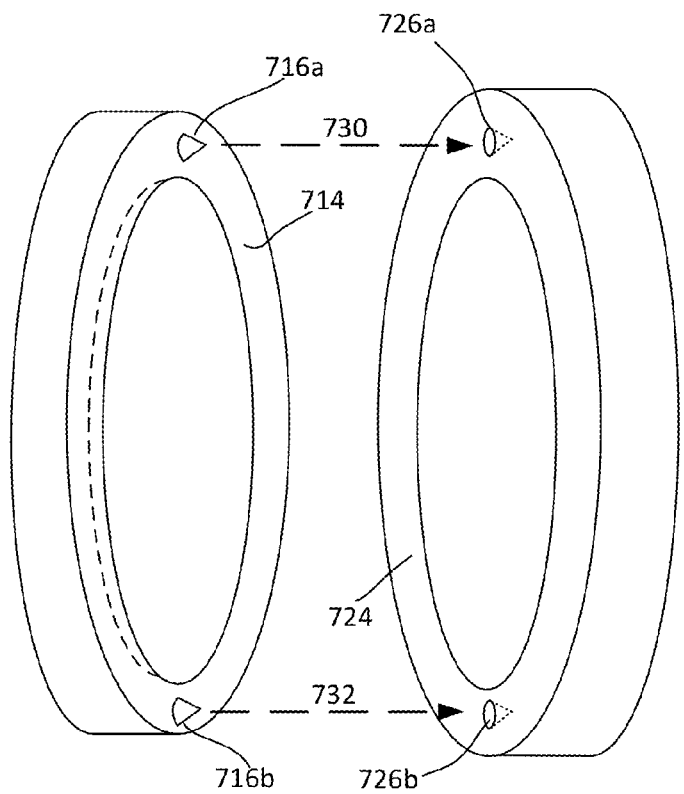
Figure 7

OPTICAL LENS SYSTEM

BACKGROUND

The present disclosure relates to optical lens systems, and more particularly to an optical lens assembly having a first lens element made of a sapphire glass and an electronic device including the optical lens assembly.

Optical imaging systems are commonly incorporated in personal electronic devices such as mobile phones, tablet computers, and the like. The optical imaging systems include an image sensor responsive to incident light and lens elements to direct and focus light onto the image sensor so as to form an image of an object external to the device in which the optical imaging system is incorporated. Such optical imaging systems can include multiple lens elements, and a lens barrel can be provided to hold the lens elements in alignment with each other along an optical axis. In the construction of electronic optical imaging systems, it is desirable to be able to focus incoming light received from an object onto an imaging sensor, such as a charge coupled device (CCD) or a CMOS image sensor.

Emphasis on compactness of design is especially important to resolving issues such as the thickness of the optical imaging assembly in wearable and portable electronic devices.

SUMMARY

The present disclosure relates to optical lens assemblies, and more particularly to an optical lens assembly with the first lens element on the object side having a high refractive index and being extremely scratch-resistant.

Certain embodiments of the present invention relate to an optical lens system that can be used in a portable electronic device (e.g., a camera in a cellular phone). Portions of the optical lens system include an optical lens assembly. According to certain embodiments of the present invention, the optical lens assembly may include two or more optical lens elements.

In some embodiments, an optical lens assembly may include lens elements aligned along an optical axis. A first lens element has a planar object-side surface and a first fitting structure disposed on a periphery of an image-side surface. A second lens element has a second fitting structure disposed on a circumferential periphery of an object-side surface. The first and second fitting structures are fittedly engaged with each other. The first lens element has a refractive index greater than 1.6 and is made of a sapphire glass.

In some embodiments, the first fitting structure may be an annular-shaped (ring-shaped) groove having a V shape, and the second fitting structure may be an annular-shaped protrusion having an inverted-V shape. In another embodiment, the first fitting structure may be an annular-shaped protrusion having an inverted-V shape, and the second fitting structure may be an annular-shaped groove having a V shape.

In some embodiments, the annular protrusion may have a flat top surface or a rounded top surface.

In some embodiments, the first fitting structure may have multiple first fitting members disposed in a regular or irregular pattern along the periphery of the image-side surface of the first lens element, and each of the first fitting member is a groove having a conical shape. The second fitting structure may have multiple second fitting members disposed in a matching position in relation to the location of the first fitting members. Each of the second fitting members can be a protruding cone that fittedly engages with a corresponding conical groove.

In some embodiments, the first fitting structure may have multiple first fitting members disposed in a regular or irregular pattern along the periphery of the image-side surface of the first lens element. Each of the first fitting members can be a protruding cone having a base at the image-side surface and an apex protruding toward the object-side surface of the second lens element. The second fitting structure may have multiple second fitting members disposed in a matching position in relation to the location of the first fitting members. Each of the second fitting members can be a groove having a conical shape for receiving a corresponding protruding cone.

Embodiments of the present invention can provide a simplification and improvement in the design and fabrication of the optical lens system that can further reduce the length or thickness of the optical lens assembly.

The following description, together with the accompanying drawings, will provide a better understanding of the nature and advantages of the claimed invention.

BRIEF DESCRIPTION OF THE DRAWINGS

FIG. 4C is an enlarged partial cross-sectional view of FIG. 4A.

FIG. 6A is a simplified cross-sectional view illustrating a coupling mechanism between the first and second optical lens elements according to an embodiment of the present invention.

FIG. 6B is an enlarged partial cross-sectional view of FIG. 6A.

FIG. 7 is a perspective view illustrating a coupling mechanism between the first and second optical lens elements according to an embodiment of the present invention.

DETAILED DESCRIPTION

The present invention relates to optical lens assemblies, and more particularly to optical lens assemblies with the first lens element on the object side having a high refractive index and being extremely scratch-resistant. Optical lens assemblies can have broad applications in portable and wearable electronic devices, such as mobile phones, head mounted devices, tablet computers, and the like that use a CCD or a CMOS image sensor. Specific embodiments are described below. Those skilled in the art with access to the present disclosure will recognize that other optical lens assemblies can also be designed within the scope of the present invention.

It should be understood that the drawings are not drawn to scale, and similar reference numbers are used for representing similar elements. For example, the dimensions of some of the elements may be exaggerated relative to others for clarity. Various embodiments are described herein by way of example, and features described with respect to different embodiments may be combined and interchanged, without departing from the scope or spirit of the present invention.

Figure 1:
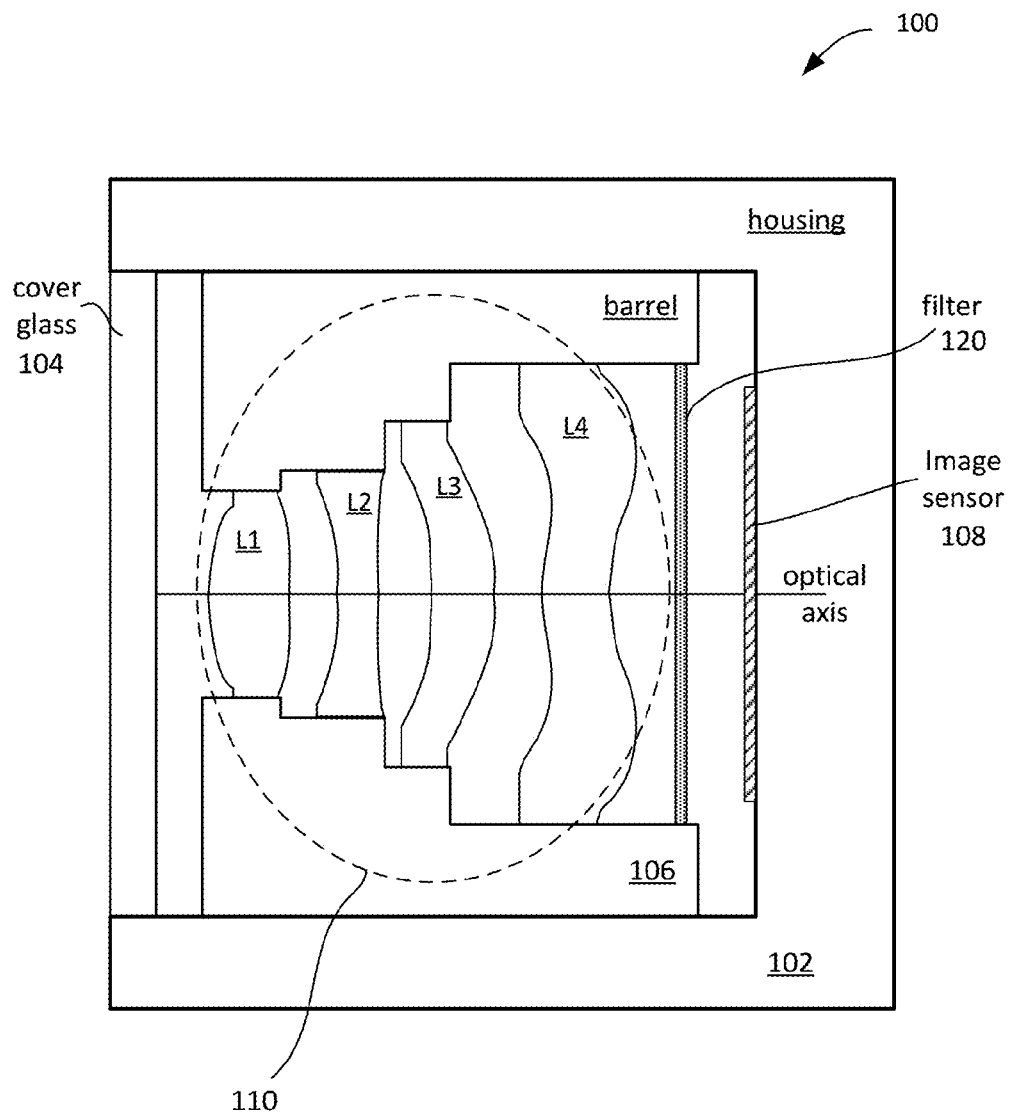
FIG. 1 is a simplified cross-sectional view of a camera assembly.

FIG. 1 is a simplified cross-sectional view of a camera assembly 100. Camera assembly 100 includes a housing 102 supporting a cover glass 104, a barrel 106, and an image sensor 108. Barrel 106 includes an optical lens assembly 110 having multiple lens elements L1, L2, L3, and L4 aligned along an optical axis to direct light received through cover glass 104 onto image sensor 108. Camera assembly 100 may include a filter 120 disposed between optical lens assembly 110 and image sensor 108. Cover glass 104 can be an optically-transparent cover mounted in front of optical lens assembly 120 to prevent dust from entering housing 112 and to protect lens element L1 against scratches or damage.

Figure 2:
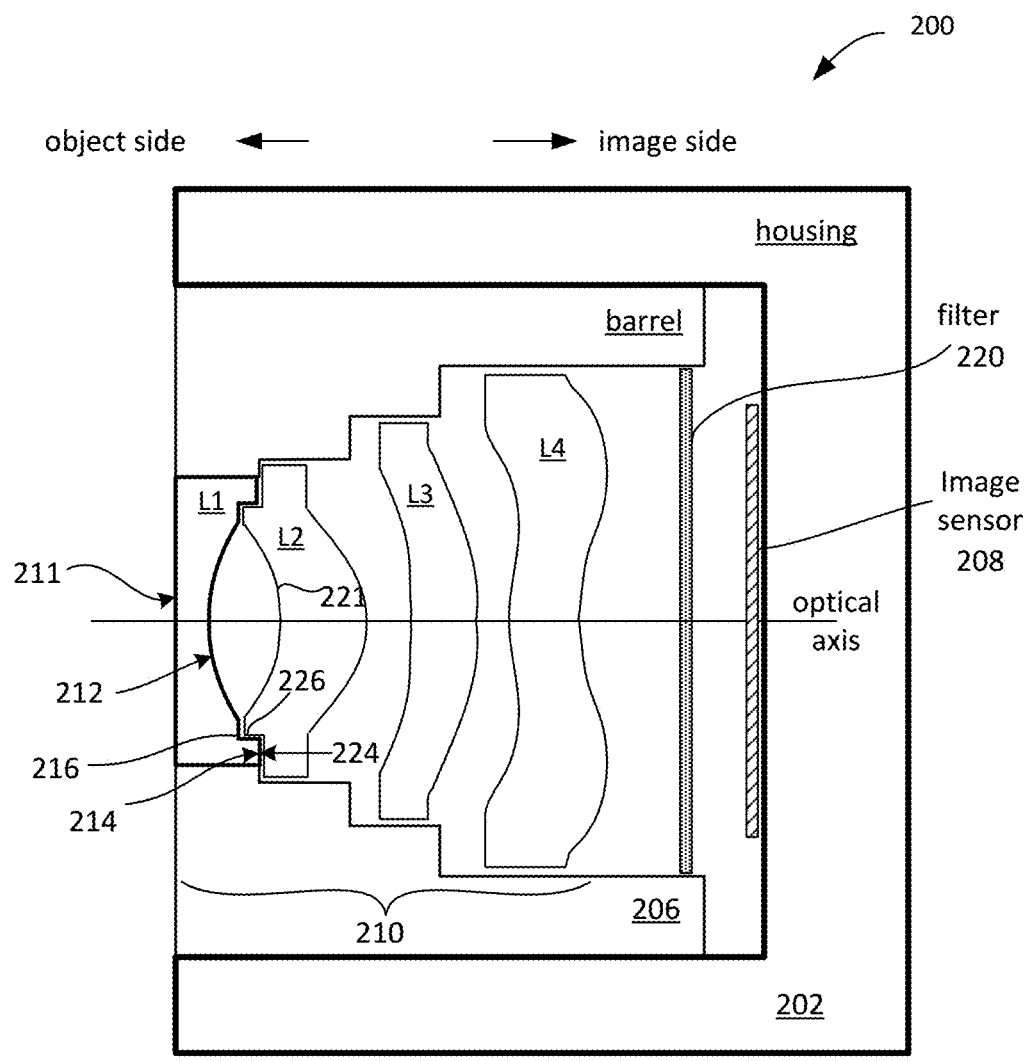
FIG. 2 is a simplified cross-sectional view of an optical lens system according to an embodiment of the present invention.

FIG. 2 is a simplified cross-sectional view of a camera lens system 200 according to an embodiment of the present invention. Camera lens system 200 includes a housing 202 supporting a barrel 206 and an image sensor 208. An optical lens assembly 210 is mounted within barrel 206 and includes a number of lens elements aligned along the optical axis. Four lens elements L1, L2, L3, and L4 are shown aligned along the optical axis in FIG. 2, with L1 being the first lens element, L2 being the second lens element, L3 being the third lens element, and L4 being the fourth element disposed from the object side to the image side in order. The number four is arbitrarily chosen for purposes of illustration, and any number of optical lens elements can be included. Camera lens system 200 may include a filter 220 for passing a specific light spectrum to image sensor 208.

Any simplification of the mechanical design which eliminates parts or which simplifies the fabrication process of the optical lens system is advantageous for reducing the fabrication cost, the thickness, and/or the weight of the optical lens system. In the structure shown in FIG. 2, for example, the cover glass has been eliminated to reduce the length (or thickness) of camera lens system 200. In this structure, the object-side surface of first lens L1 can be exposed to air or other external elements.

In some embodiments, first lens element L1 can be made of a sapphire glass, which can be an optically transparent material made predominantly or entirely of sapphire crystals. The use of sapphire glass offers a number of advantages. For example, the mechanical strength of sapphire glass provides a substantially higher resistance against scratch and breakage as compared to other optical materials commonly used in compact optical lens assemblies (e.g., plastics). Additionally, sapphire glass has a relatively high index of refraction (greater than 1.6). The planar-concave shaped lens element L1 is easy to fabricate from sapphire glass and can be used as both a lens having a refractive power and a protective cover for the optical lens assembly. In some embodiments, the planar object-side surface of lens element L1 can have a diameter in the range between 3 mm and 6 mm, which is suitable for telephoto lens systems having a field of view in the range between 30 degrees and 40 degrees. Other lens elements (e.g., lens elements L2, L3, L4) can be made of plastic or any other optically-transparent material with a refractive index not equal to 1.

Figure 3:
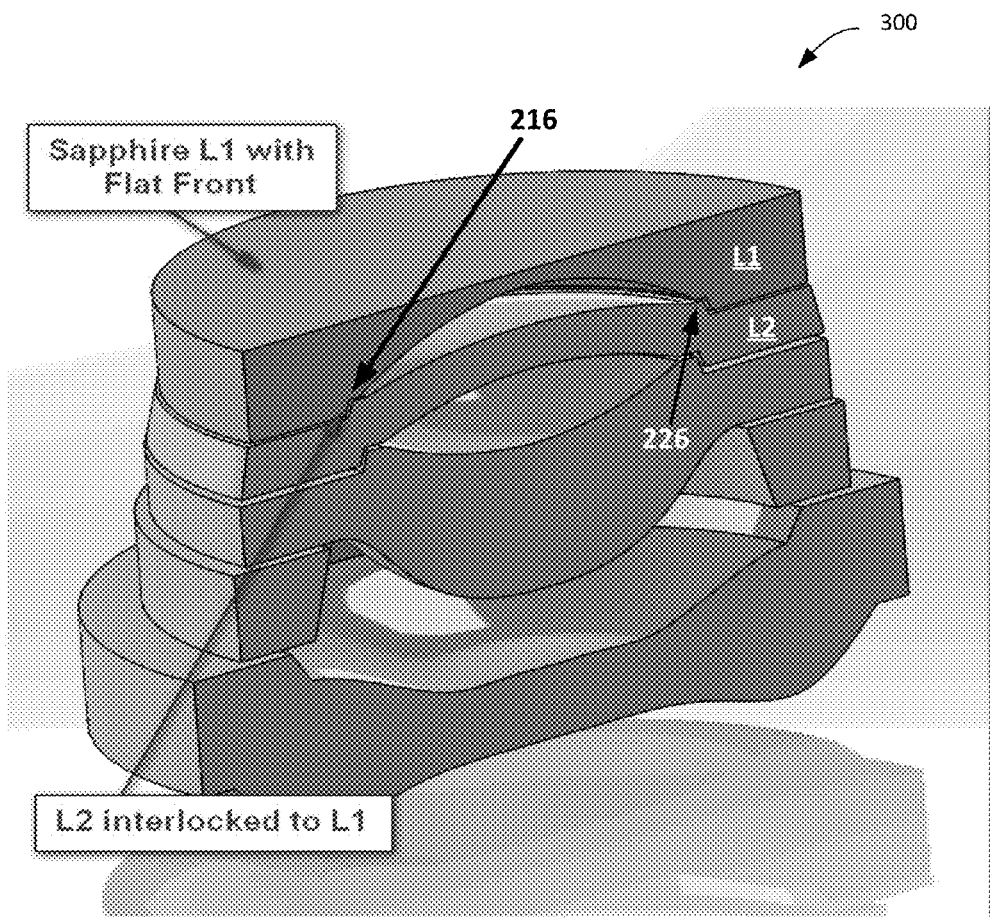
FIG. 3 is a perspective view of an exemplary optical lens assembly according to an embodiment of the present invention.

FIG. 3 is a perspective view of an optical lens assembly 300 according to an embodiment of the present invention, which can be similar or identical to optical lens assembly 210 of FIG. 2. As seen in the cross-sectional view of FIG. 2 and the perspective view of FIG. 3, the optical lens assembly provides a structure without cover glass 104 of FIG. 1. First lens element L1 has a planar object-side surface 211, a concave image-side surface 212 in the vicinity of the optical axis, and a planar surface 214 at the image-side periphery (which can be outside the clear-aperture diameter of the image side of lens element L1). An annular (ring-shaped) groove 216 can be formed in the image-side periphery of first lens element L1. Second lens element L2 has an object-side planar surface 224 at the object-side periphery (which can be outside the clear-aperture diameter of the object side of lens element L2), and an annular (ring-shaped) protrusion 226 is formed on the object-side periphery. First lens element L1 and second lens element L2 are fittedly engaged with each other by means of annular groove 216 and annular protrusion 226 as shown in FIGS. 2 and 3.

Figure 4A:
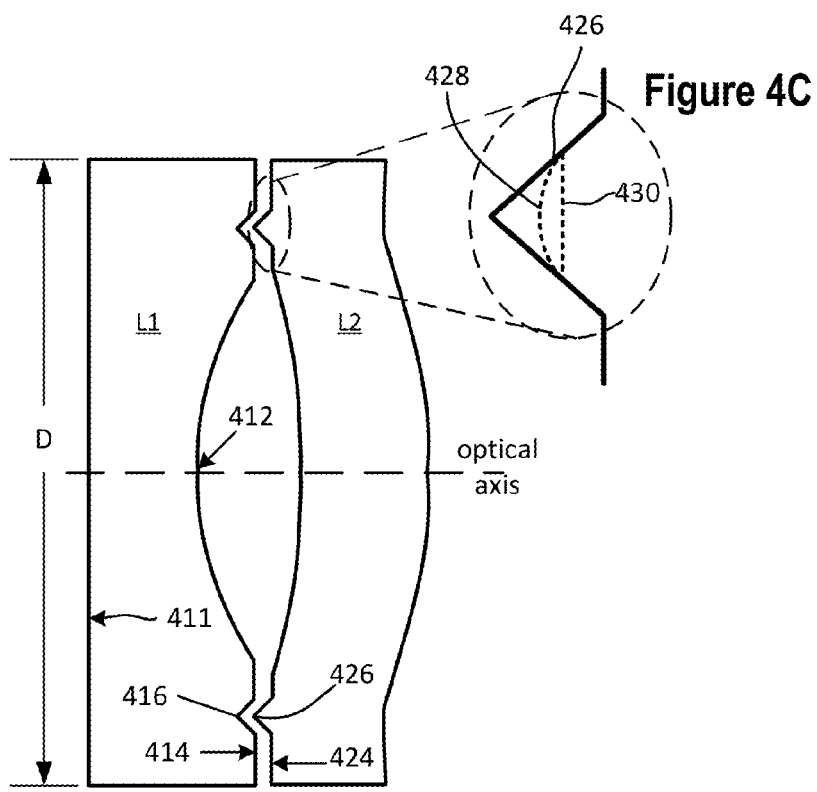
FIG. 4A is a simplified cross-sectional view illustrating a coupling mechanism between the first and second optical lens elements of FIGS. 2 and 3.

FIG. 4A is a simplified cross-sectional view illustrating a coupling mechanism between a first lens element L1 and a second lens element L2 according to an embodiment of the present invention. First lens element L1 is shown as having a planar object-side surface 411 and a concave image-side surface 412 in the vicinity of the optical axis and a planar surface 414 at its image-side periphery. An annular groove 416 is formed in image-side peripheral surface 414. Groove 416 can be V-shaped, extending inward into the image-side periphery of first lens element L1. Planar object-side surface 411 of first lens element L1 can have a diameter "D" in the range between 3 mm and 6 mm, or other diameter as desired. Second lens element L2 has a planar surface 424 at its object-side periphery. An annular protrusion 426 is formed on object-side peripheral surface 424. Protrusion 426 can have an inverted V shape having a dimension matching the dimension of groove 416 so that first and second lens elements L1 and L2 can be interlocked by inserting protrusion 426 into groove 416, as shown in FIG. 4A.

Figure 4B:
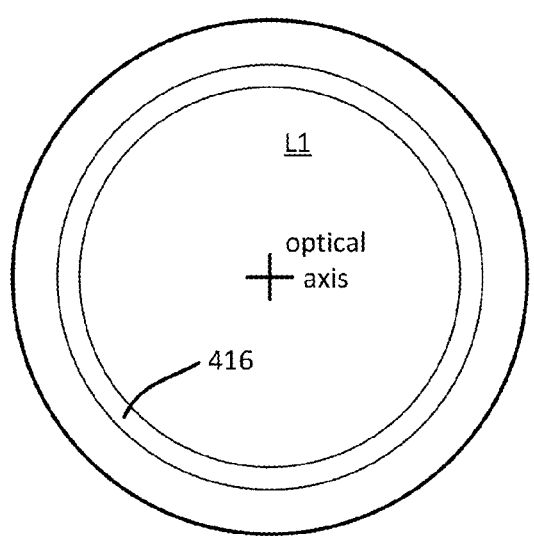
FIG. 4B is an image-side top view of the first optical lens element according to an embodiment of the present invention.

FIG. 4B is a top view of the image-side of first lens element L1 illustrating annular groove 416 of FIG. 4A.

While the inverted V shaped protrusion of second lens element L2 provides a satisfactory coupling mechanism to the V-shaped groove of first element L1, there is a possibility, within dimension tolerances in fabrication, that the height of the protrusion may exceed the depth of the groove, and this may be undesirable. In some embodiments, the protrusion may have a rounded top surface 428 or a flat top surface 430, as shown in FIG. 4C.

Figure 5:
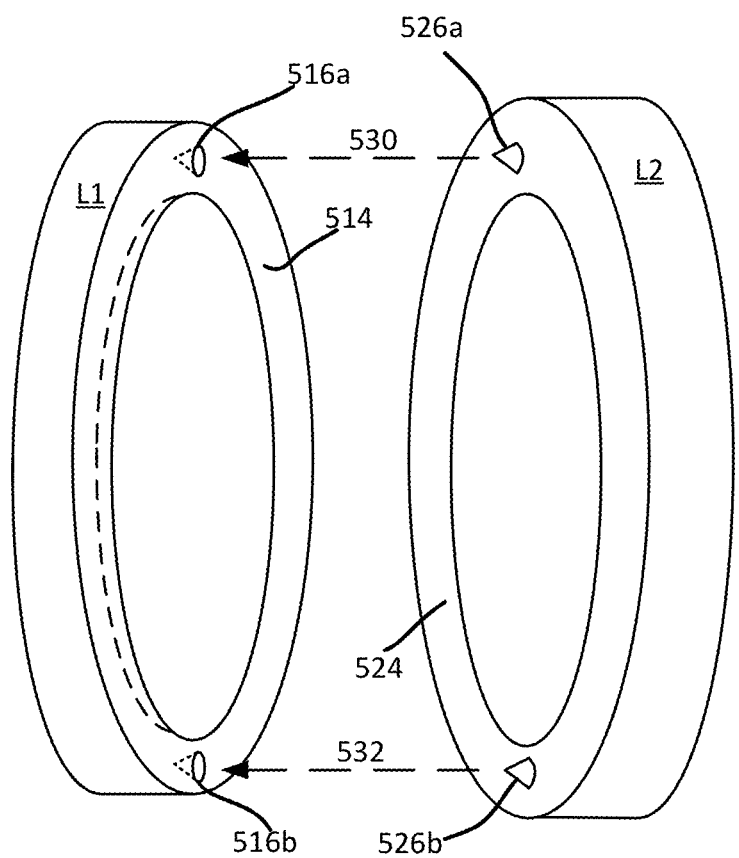
FIG. 5 is a perspective view of the first and second optical lens elements according to an embodiment of the present invention.

FIG. 5 is a simplified cross-sectional view of first lens element L1 and second lens element L2 according to another embodiment of the present invention. As shown, planar surface 514 at the image-side periphery of first lens element L1 has multiple first fitting members. For example, fitting members 516a and 516b are disposed at diagonally opposite sides of the image-side periphery of first lens element L1. Although two first fitting members are shown, it is understood that any number of first fitting members can be provided. In some embodiments, each first fitting member has a conical shape having the upper surface coplanar with the planar circumferential image-side surface of first lens element L1 and the apex pointing toward the planar object-side surface of first lens element L1.

Still referring to FIG. 5, second lens element L2 is shown to have multiple second fitting members disposed on the planar object-side periphery. For example, second fitting members 526a and 526b are disposed at diagonally opposite sides of the object-side periphery 524 of second lens element L2 and have a conical-shaped protrusion configured to couple with first fitting members 516a and 516b. As seen in FIG. 5, the conical shaped grooves of first fitting members 516a and 516b are configured to receive the corresponding conical-shaped protrusions of second fitting members 526a and 526b as indicated by respective arrows 530 and 532. In some embodiments, second fitting members 526a and 526b can have rounded or flat tops, similarly to embodiments shown in FIG. 4C.

FIG. 6A is a simplified cross-sectional view of first lens element L1 and second lens element L2 according to another embodiment of the present invention. First lens element L1 is shown as having a planar object-side surface 611, a concave image-side surface 612 in the vicinity of the optical axis and a planar peripheral surface 614 at the image-side periphery. A circumferential or annular protrusion 616 is formed on the image-side peripheral surface 614. Protrusion 616 has an inverted V-shape with the base disposed on the planar peripheral surface and the top pointing toward the object-side surface of second lens element L2. Planar object-side surface 611 of first lens element L1 can have a diameter D in the range between 3 mm and 6 mm or other diameter as desired. Second lens element L2 has a planar peripheral surface 624 at the object-side periphery. A circumferential or annular groove 626 is formed in the planar peripheral surface 624. Groove 626 has a V shape having a dimension matching the dimension of protrusion 616 to receive protrusion 616 so that first and second lens elements L1 and L2 can be interlocked by coupling protrusion 616 with groove 626, as shown in FIG. 6A.

While the inverted V shaped protrusion of first lens element L2 provides a satisfactory coupling to the V-shaped groove of second lens element L1, there is a possibility, within dimension tolerances in fabrication, that the height of the protrusion may exceed the depth of the groove, and this may not be desirable. In some embodiments, the protrusion may have a rounded top surface 618 or a flat top surface 619, as shown in FIG. 6B.

FIG. 7 is a simplified cross-sectional view of first lens element L1 and second lens element L2 according to yet another embodiment of the present invention. As shown, planar surface 714 at the image-side periphery of first lens element L1 has multiple first fitting members. For example, fitting members 716a and 716b are disposed at diagonally opposite sides of the image-side periphery of first lens element L1. Although two first fitting members are shown, it is understood that any number of first fitting members can be provided. In some embodiments, each first fitting member has a conical shape having the base formed on image-side peripheral surface 714 of first lens element L1 and the apex pointing toward the object-side surface of second lens element L2.

Still referring to FIG. 7, second lens element L2 is shown to have multiple second fitting members disposed on the planar object-side circumferential periphery 724. For example, second fitting members 726a and 726b are disposed at diagonally opposite sides of the object-side periphery 724 of second lens element L2 and have a conical-shaped groove configured to receive first fitting members 716a and 716b. As seen in FIG. 7, the conical shaped grooves of second fitting members 726a and 726b receive the conical-shaped protrusions of first members 726a and 726b as indicated by respective arrows 730 and 732. Note that although two first and second fitting members are shown, it is understood that any number of first fitting members can be provided.

Embodiments of the present invention can simplify fabrication of an optical lens assembly, for example by eliminating the need for a cover glass. This can reduce the length (thickness) of the optical lens system as well as the overall cost of the assembly. The use of a sapphire glass for the first lens element provides a scratch resistant optical lens assembly.

While the invention has been described with respect to specific embodiments, one skilled in the art will recognize that numerous modifications are possible. For example, the specific shapes of lens surfaces and number of lenses can be modified as desired. The number, location, and shape of fitting members can also be varied, and fitting members having a combination of different shapes can be used. For example, the image-side periphery of first lens element L1 can have one or more fitting members formed as conical indentations and one or more fitting members formed as conical protrusions, while the object-side periphery of second lens element L2 can have a complementary set of fitting members.

Thus, although the invention has been described with respect to specific embodiments, it will be appreciated that the invention is intended to cover all modifications and equivalents within the scope of the following claims.

What is claimed is:

1. An optical lens assembly comprising a plurality of lens elements aligned along an optical axis, the optical lens assembly comprising:
   a first lens element made of a material having a refractive index greater than 1.6, the first lens element having a planar object-side surface and a first fitting structure disposed on an image-side peripheral surface; and
   a second lens element having a second fitting structure disposed on an object-side peripheral surface, the first and second fitting structures being fittedly engaged with each other;
   wherein the planar object-side surface of the first lens element has a diameter in a range between 3 mm and 6 mm.

2. The optical lens assembly of claim 1, wherein the image-side peripheral surface of the first lens element and the object-side peripheral surface of the second lens element are planar surfaces.

3. The optical lens assembly of claim 1, wherein the first fitting structure is an annular V-shaped groove and the second fitting structure is an annular protrusion having an inverted-V shape.

4. The optical lens assembly of claim 3, wherein the annular protrusion has a flat top surface.

5. The optical lens assembly of claim 3, wherein the annular protrusion has a rounded top surface.

6. The optical lens assembly of claim 1, wherein the first fitting structure is an annular protrusion having an inverted-V shape and the second fitting structure is an annular V-shaped groove.

7. The optical lens assembly of claim 1, wherein the first lens element is made of a sapphire glass.

8. The optical lens assembly of claim 1, wherein the optical lens assembly has a field of view in a range between 30 degrees and 40 degrees.

9. The optical lens assembly of claim 1, wherein the first fitting structure comprises a plurality of first fitting members, each of the first fitting members being a groove having a conical shape; and the second fitting structure comprises a plurality of second fitting members, each of the second fitting members having a protruding conical shape.

10. The optical lens assembly of claim 1, wherein the first fitting structure comprises a plurality of first fitting members, each of the first fitting members having a protruding conical shape; and the second fitting structure comprises a plurality of second fitting members, each of the second fitting members being a groove having a conical shape.

11. The optical lens assembly of claim 1, wherein the first lens element has a concave image-side surface in a vicinity of the optical axis.

12. A portable electronic device comprising:
    a housing; and an optical lens assembly mounted in the housing, the optical lens assembly comprising:
- a first lens element having a planar object-side surface and a first fitting structure disposed on an image-side peripheral surface, the first lens element having a refractive index greater than 1.6; and
- a second lens element having a second fitting structure disposed on an object-side peripheral surface, the first and second fitting structures being fittedly engaged with each other;
- wherein the planar object-side surface of the first lens element has a diameter in a range between 3 mm and 6 mm.

13. The portable electronic device of claim 12, wherein the first fitting structure is an annular V-shaped groove and the second fitting member is an annular protrusion having an inverted-V shape.

14. The portable electronic device of claim 12, wherein the first fitting structure is an annular protrusion having an inverted-V shape and the second fitting member is an annular V-shaped groove.

15. The portable electronic device of claim 12, wherein the first fitting structure comprises a plurality of first fitting members, each of the first fitting members being a groove having a conical shape; and the second fitting structure comprises a plurality of second fitting members, each of the second fitting members having a protruding conical shape.

16. The portable electronic device of claim 12, wherein the first fitting structure comprises a plurality of first fitting members, each of the first fitting members having a protruding conical shape; and the second fitting structure comprises a plurality of second fitting members, each of the second fitting members being a groove having a conical shape.

17. The portable electronic device of claim 12, wherein the first lens element has a concave image-side surface in a vicinity of the optical axis.

18. The portable electronic device of claim 12, wherein the first lens element is made of a sapphire glass.

19. The portable electronic device of claim 12, wherein the image-side peripheral surface of the first lens element and the object-side peripheral surface of the second lens element are planar surfaces.

* * * * *